United States Patent
Ono et al.

(10) Patent No.: US 8,677,261 B2
(45) Date of Patent: Mar. 18, 2014

(54) IN-VEHICLE DISPLAY SYSTEM

(75) Inventors: Takatsugu Ono, Kobe (JP); Noriyuki Kamikawa, Kobe (JP); Tatsuki Kubo, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 668 days.

(21) Appl. No.: 12/949,319

(22) Filed: Nov. 18, 2010

(65) Prior Publication Data

US 2011/0131519 A1 Jun. 2, 2011

(30) Foreign Application Priority Data

Nov. 27, 2009 (JP) ................................ 2009-269809

(51) Int. Cl.
 *G06F 3/048* (2013.01)
(52) U.S. Cl.
 USPC ........................................... 715/771; 701/36
(58) Field of Classification Search
 USPC ..................................... 715/771; 701/400, 36
 See application file for complete search history.

(56) References Cited

U.S. PATENT DOCUMENTS

| | | | | |
|---|---|---|---|---|
| 5,404,458 | A * | 4/1995 | Zetts ............................. | 710/73 |
| 5,864,635 | A * | 1/1999 | Zetts et al. .................... | 382/187 |
| 2002/0149621 | A1 | 10/2002 | Yamaguchi et al. | |
| 2004/0141007 | A1* | 7/2004 | Amari et al. ................. | 345/771 |
| 2006/0242650 | A1* | 10/2006 | Tsunedomi et al. .......... | 719/318 |
| 2007/0174788 | A1* | 7/2007 | Ording .......................... | 715/816 |
| 2008/0201662 | A1* | 8/2008 | Millington ................... | 715/810 |
| 2009/0085875 | A1* | 4/2009 | Inoue et al. .................. | 345/171 |
| 2010/0141609 | A1* | 6/2010 | Frisbee ......................... | 345/184 |
| 2010/0241993 | A1* | 9/2010 | Chae ............................. | 715/830 |
| 2012/0212411 | A1* | 8/2012 | Oh ................................ | 345/157 |

FOREIGN PATENT DOCUMENTS

| | | |
|---|---|---|
| JP | A-2000-249568 | 9/2000 |
| JP | A-2002-259036 | 9/2002 |
| JP | A-2005-182345 | 7/2005 |
| JP | A-2006-338490 | 12/2006 |

OTHER PUBLICATIONS

Sep. 10, 2013 Notice of Rejection issued in Japanese Patent Application No. 2009-269809 (with translation).

* cited by examiner

*Primary Examiner* — Omar Abdul-Ali
*Assistant Examiner* — Anil Bhargava
(74) *Attorney, Agent, or Firm* — Oliff PLC (57) ABSTRACT

An in-vehicle display system is installed in a vehicle for displaying information to a user. The system includes a display unit that displays information; an operation unit that is located separately from the display unit and that allows a user to perform user operations including a directional operation and a turning operation; and a receiver that receives user instructions for making entry of plural characters that can be displayed on the display unit, based on displayed content displayed on the display unit and the user operations made with the operation unit. The receiver receives: (i) a first one of the directional operation and the turning operation as the user instruction in order to select a group from amongst a plurality of groups displayed on the display unit each of the plurality of groups representing a plurality of characters which are candidates for entry, and (ii) a second one of the directional operation and the turning operation as the user instruction in order to select a character from amongst the plural characters included in the group that is selected by the first one of the directional operation and the turning operation.

9 Claims, 11 Drawing Sheets

IN-VEHICLE DISPLAY SYSTEM

BACKGROUND OF THE INVENTION

1. Field of the Invention

The invention relates to an in-vehicle display system that is installed in a vehicle for displaying information to a user.

2. Description of the Background Art

Conventionally, in-vehicle display systems such as a navigation apparatus and an audio apparatus are known. They are installed in vehicles such as an automobile to provide a variety of information to a user (typically to a driver). In these in-vehicle display systems, the user may enter characters for destination setting on the navigation apparatus, title change of audio data on the audio apparatus, or other situations.

A conventional in-vehicle display system normally adopts a touch-screen system where characters are entered in such a manner that the user touches a command button corresponding to an intended character in a screen displaying a plurality of candidate characters for making entry of characters. A display of the in-vehicle display system, adopting the touch-screen system, needs to be located where the user can touch it. As a result, a limitation for locating the display arises.

Thus, some in-vehicle display systems adopt a structure that a display and a controller member are set separately as follows; the display is located at an easy-to-see location for a user and the controller member is located at the location easily operable for the user. Under this structure, characters need to be entered by using the controller member separated from the display.

One possible example method for making entry of characters is that a user moves a cursor using the controller member for a directional operation to select a character from a plurality of candidate characters for making entry of characters shown on a display screen. This method requires the cursor to be moved one by one up to an objective character on a screen showing a plurality of characters. Here, when inputting a Japanese "Hiragana," the screen shows a large number of characters included in "Hiragana," for example, arrayed in order of 50-character syllabary. This method, due to the large number of candidate characters arrayed, requires cumbersome operations, and naturally it takes longer to select the objective character.

In this regard, for example, Japanese Patent Laid-open Publication No. 2000-249568 proposes a technology adopting a controller member allowing the user to perform a turning operation. Under the technology, turning the controller member at relatively high speed moves the cursor at high speed while skipping unnecessary characters. Besides, turning the controller member at relatively slow speed moves the cursor one by one over the characters.

However, under this technology, a user has to consciously perform two types of operations using the controller member by different manners of a high-speed turning and a low-speed turning. Therefore, the user has to fully get used to the operation of the controller member. Especially it is very difficult to move the cursor accurately up to the objective character with the high-speed turning. It may take longer to select a character due to an error high-speed turning. In an example, an inappropriate high-speed turning moves the cursor far over from the objective character, and this requires extra operations such as a cursor control one by one returning to the objective character.

SUMMARY OF THE INVENTION

According to one aspect of the invention, an in-vehicle display system for installation in a vehicle, the system including a display unit that displays information; an operation unit that is located separately from the display unit and that allows a user to perform user operations including a directional operation and a turning operation; and a receiver that receives user instructions for making entry of plural characters that can be displayed on the display unit, based on displayed content displayed on the display unit and the user operations made with the operation unit. The receiver receives: (i) a first one of the directional operation and the turning operation as the user instruction in order to select a group from amongst a plurality of groups displayed on the display unit each of the plurality of groups representing a plurality of characters which are candidates for entry, and (ii) a second one of the directional operation and the turning operation as the user instruction in order to select a character from amongst the plural characters included in the group that is selected by the first one of the directional operation and the turning operation.

Using of the two types of operations, the directional operation and the turning operation, allows the user to make selection of the group and selection of the character which is included in the selected group, individually. Thus, the user can quickly and accurately select an intended character by a few operations. As a result, this system provides greater user-friendliness in making entry of characters.

According to another aspect of the invention, the receiver receives the directional operation as the user instruction for selecting the group, and receives the turning operation as the user instruction for selecting the character that is included in the group that is selected.

The user can intuitively operate the operation unit.

According to another aspect of the invention, the operation unit includes one controller member by which the user performs both of the turning operation and the directional operation. Besides, the receiver receives the user instruction given by the turning operation in preference to the user instruction given by the directional operation.

Even if the turning operation and the directional operation are performed at the same time due to inclusion of one controller member, this system prevents an error operation and allows the user to select an intended character quickly and accurately.

Therefore, an object of the invention is to provide an in-vehicle display system that allows for quick and accurate selection of an intended character with a few operations.

These and other objects, features, aspects and advantages of the present invention will become more apparent from the following detailed description of the present invention when taken in conjunction with the accompanying drawings.

DESCRIPTION OF THE EMBODIMENTS

Hereinafter, an embodiment of the invention will be described with reference to attached drawings.

<1. Configuration>

Figure 1:
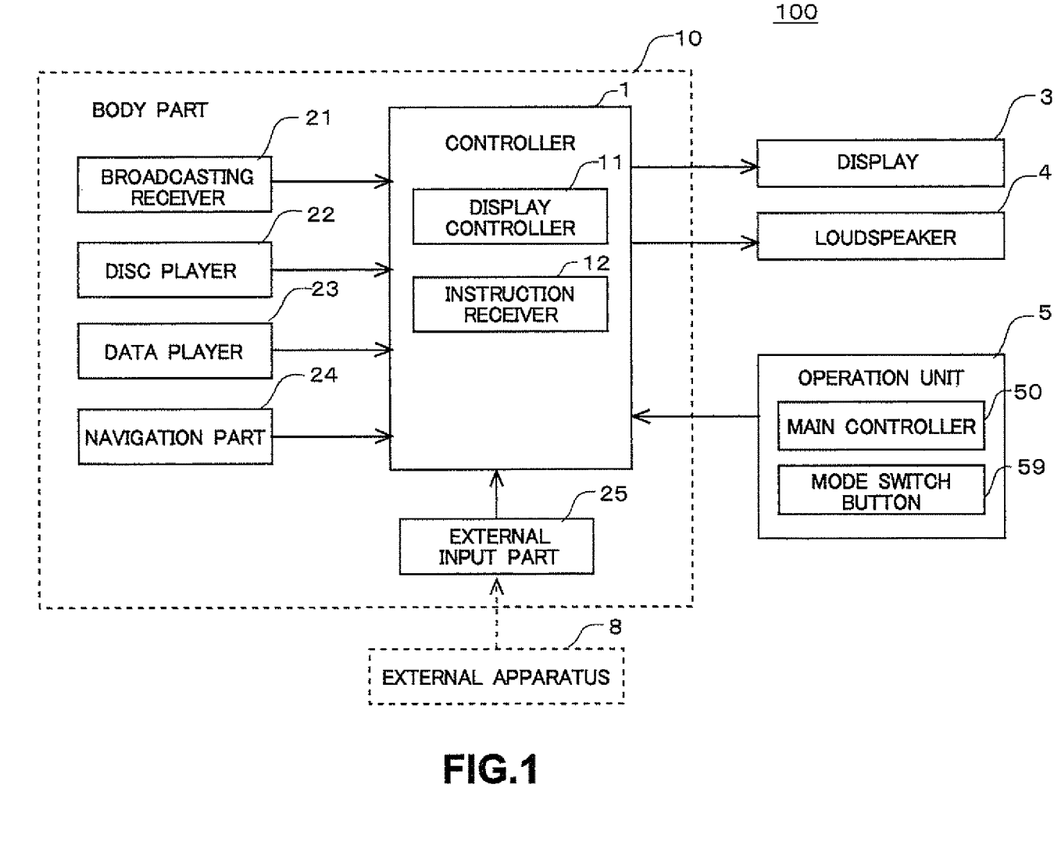
FIG. 1 is a block diagram showing a configuration outline of an in-vehicle display system.

FIG. 1 is a block diagram showing a configuration outline of an in-vehicle display system 100 that is an embodiment of this invention. The in-vehicle display system 100 is designed to be installed in a vehicle (a car in this embodiment) and displays information to a user such as a driver in a vehicle cabin. The in-vehicle display system 100, having an audio function and a navigation function as major functions, displays information such as audio titles being played by the audio function, and map images for navigation.

As shown in FIG. 1, the in-vehicle display system 100 includes a body part 10 that implements a variety of processing, a display 3 that displays a variety of information, a loudspeaker 4 that outputs a variety of sounds, and an operation unit 5 with which a user operates the system.

The body part 10, configured as an ECU (Electronic Control Unit), is located at a predetermined position invisible from the vehicle cabin. The body part 10 includes a controller 1 that functions to control the entire system of the in-vehicle display system 100, a broadcasting receiver 21 that receives broadcast signals, a disc player 22 that plays a disc, a data player 23 that plays digital audio data, a navigation part 24 that provides the navigation function, and an external input part 25 that receives the signals input from an external apparatus 8.

The broadcasting receiver 21 obtains video signals and audio signals from the received broadcast signals of digital terrestrial television broadcasting as well as radio broadcasting such as AM and FM. The loudspeaker 4 outputs sounds based on the audio signals obtained by the broadcasting receiver 21. The display 3 displays videos based on the video signals obtained by the broadcasting receiver 21.

The disc player 22 obtains the audio signals and the video signals by reading information recorded in a disc media such as a CD, a DVD and a 13D. The loudspeaker 4 outputs sounds based on the audio signals obtained by the disc player 22. The display 3 displays videos based on the video signals obtained by the disc player 22.

The data player 23, including a hard disc, obtains playable audio signals by reading and decoding the digital audio data such as MP3, which is stored beforehand in the hard disc. The loudspeaker 4 outputs sounds based on the audio signals obtained by the data player 23.

The navigation part 24 provides map images to be displayed in the display 3 in accordance with the current location of the vehicle. Besides, the navigation part 24 provides route guidance to a destination when the destination is set. The navigation part 24, including a GPS, obtains the current location information of the vehicle via the GPS. The display 3 displays the map images including the route to the destination. The loudspeaker 4 outputs voices for the route guidance.

The external input part 25 outputs to the controller 1 the audio signals that were obtained from the external apparatus 8 (such as a portable music player of a user) connected to the in-vehicle display system 100. Then, the loudspeaker 4 of the vehicle outputs the sounds based on the audio signals obtained from the external apparatus 8.

The controller 1 is configured as a computer including a CPU, a RAM and a ROM. The controller 1 functions in various controlling fields by the CPU processing in accordance with a program configured as a firmware stored in the ROM or the like beforehand. A display controller 11 and an instruction receiver 12, shown in FIG. 1, are a part of the various functions of the controller 1 implemented as described above.

The display controller 11 controls the display for the display 3. The instruction receiver 12 receives user instructions based on the user operations made with the operation unit 5, and then, controls the entire system to behave according to the user instructions.

The display 3 of the embodiment does not have a touch-screen function. For entering characters or giving a variety of instructions to the in-vehicle display system 100, the user operates the operation unit 5 for making entry of characters/command while looking at a screen on the display 3. Then, the instruction receiver 12 receives the user instructions including character entry instructions based on the user operations made with the operation unit 5, and the displayed content of the display 3 which were input by the display controller 11.

The display 3, the loudspeaker 4 and the operation unit 5 are electrically connected to the body part 10. Here, the display 3 and the loudspeaker 4 function under the control by the controller 1. The operations made by the user to the operation unit 5 are input to the controller 1 as signals.

The operation unit 5 includes a main controller 50 and a mode switch button 59. The main controller 50 is mainly operated by a user when the user gives a variety of instructions including the character entry instructions to the in-vehicle display system 100. The mode switch button 59 functions to switch operation modes of the in-vehicle display system 100. The in-vehicle display system 100 has two types of operation modes; an audio mode for providing displays relating to the audio function and a navigation mode for providing displays relating to the navigation function. The mode switch button 59 functions to switch between these two modes when the mode switch button 59 is pressed.

Figure 2:
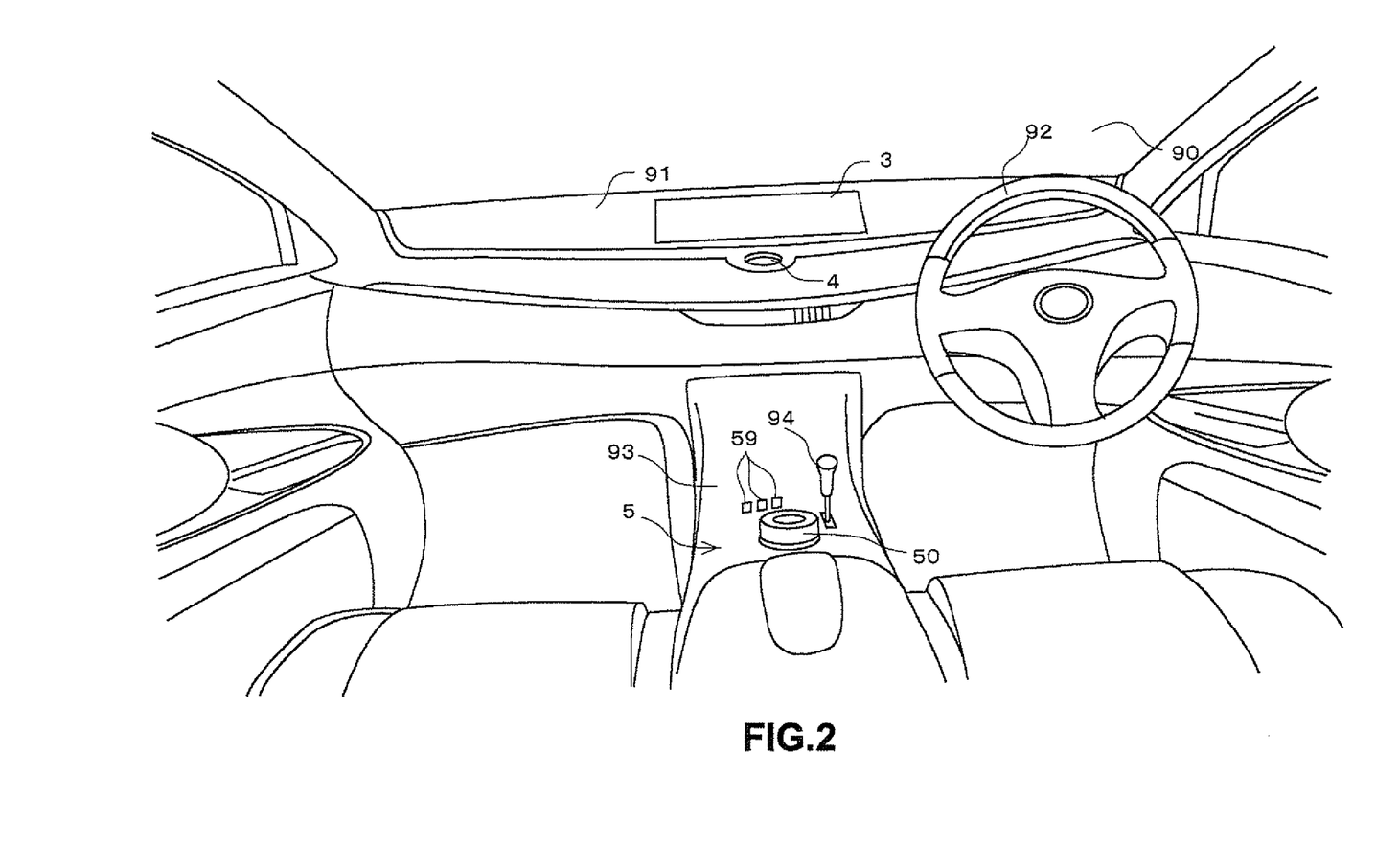
FIG. 2 shows an example placement of a display and an operation unit located in a cabin.

The display 3, the loudspeaker 4 and the operation unit 5 are located at their optimal positions respectively in the vehicle cabin, separated from the body part 10. FIG. 2 shows an example placement of the display 3, the loudspeaker 4 and the operation unit 5 in the vehicle cabin. As shown in FIG. 2, the display 3 is located at a center between the both ends of an instrument panel 91 close to a front windshield 90. This location helps to reduce the moving distance of the line of sight of a driver who is about to see the display 3. The loudspeaker 4 is located at a center between the both ends of the instrument panel 91 in an area near the display 3.

The operation unit 5 is located in an area near a gear shift lever 94 on a center console 93 of the vehicle. The main controller 50 is located on a rear side of the gear shift lever 94.

The mode switch button 59 is located near the main controller 50. The vehicle in the embodiment is a right-hand drive vehicle. Therefore, a driver operates the gear shift lever 94 with his/her left hand as needed while operating a steering wheel 92 during driving. The operation unit 5 is located near the gear shift lever 94. Therefore, the driver can operate the operation unit 5 with his/her left hand at a driving position.

The main controller 50 of the operation unit 5 includes one controller member allowing all operations, only with a left hand, of a turning operation, of a press operation (a push operation) and of a directional operation (a slide operation).

Figure 3:
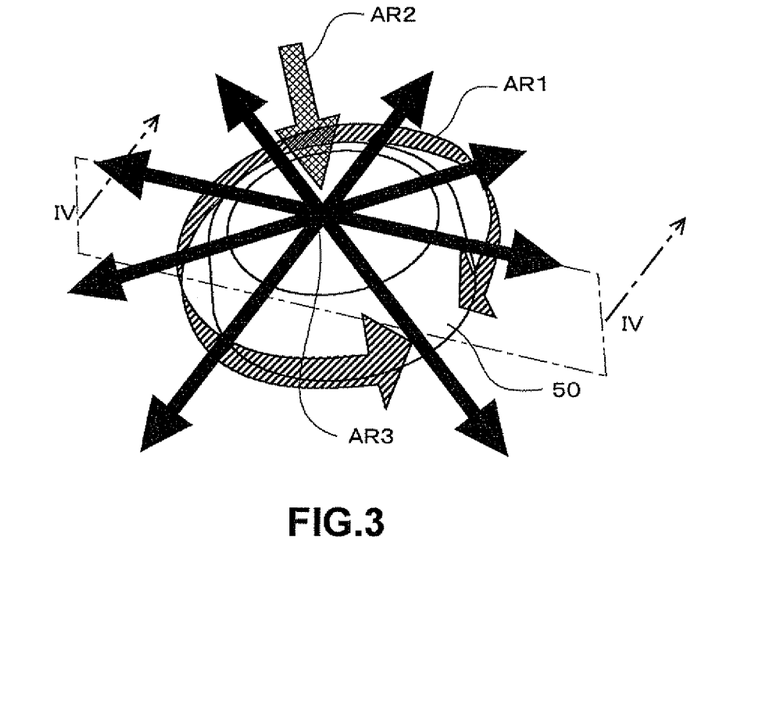
FIG. 3 is an external perspective view of a main controller.

FIG. 3 is an external perspective view of the main controller 50. As shown in FIG. 3, the main controller 50 is in an approximately-circular-cylindrical shape and is in the right size for the user to cover and hold it with one hand.

The main controller 50 is capable of controlling turning operations in two directions; clockwise and counterclockwise, shown by an arrow AR1 in FIG. 3. In response to these turning operations, a signal indicating the turning operation and a signal indicating its direction (clockwise or counterclockwise) are input to the controller 1. Moreover, the main controller 50 is capable of controlling a press operation in a direction shown by an arrow AR2 in FIG. 3. In response to this press operation, a signal indicating the press operation is input to the controller 1. Furthermore, the main controller 50 is capable of controlling slide operations in eight directions shown by arrows AR3 in FIG. 3. In response to this slide operation, a signal indicating the direction operation and a signal indicating its direction (orientating) of the slide are input to the controller 1.

Figure 4:
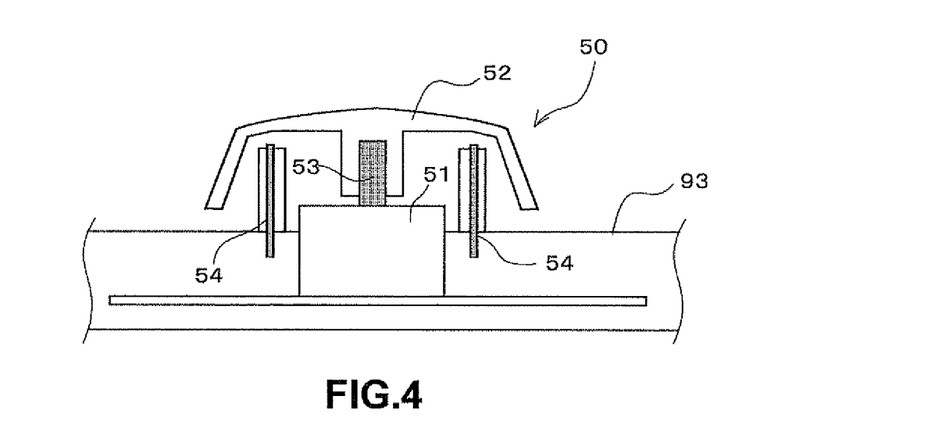
FIG. 4 is a sectional view of the main controller.

FIG. 4 is a sectional view of the main controller 50 taken along the line IV-IV in FIG. 3. As shown in FIG. 4, the main controller 50 includes a base 51 embedded in the center console 93, a holding part 52 that a user holds to operate the main controller 50, and a connection axis 53 that physically connects between the base 51 and the holding part 52. Each of physical movements (turn, press and slide) that the user performs using the holding part 52 is transmitted to the base 51 via the connection axis 53. The base 51 converts each of the transmitted physical movements into electric signals and outputs them to the controller 1.

A touch sensor 54 is located along the inside circumference of the holding part 52 and inside the holding part 52. The touch sensor 54 is a sensor that detects a touch of the user on the main controller 50 (more concretely, the holding part 52). One example of the touch sensor 54 is an electrostatic sensor that detects a touch of the user, based on a slight change of capacitance which is caused by a user hand coming close to the touch sensor 54.

<2. Entry of Characters>
<2-1. Outline of Entry Screen>

The in-vehicle display system 100 has a function for making entry of characters where a user can enter characters into the in-vehicle display system 100 at various situations. In an example of the audio mode, when a user corrects a title of audio data or an artist name, or edits the name of playlist of audio data, the function for making entry of characters is available. In an example of the navigation mode, when the user sets a keyword for searching a destination or corrects the name of the location registered in a memory, the function for making entry of characters is available.

Figure 5:
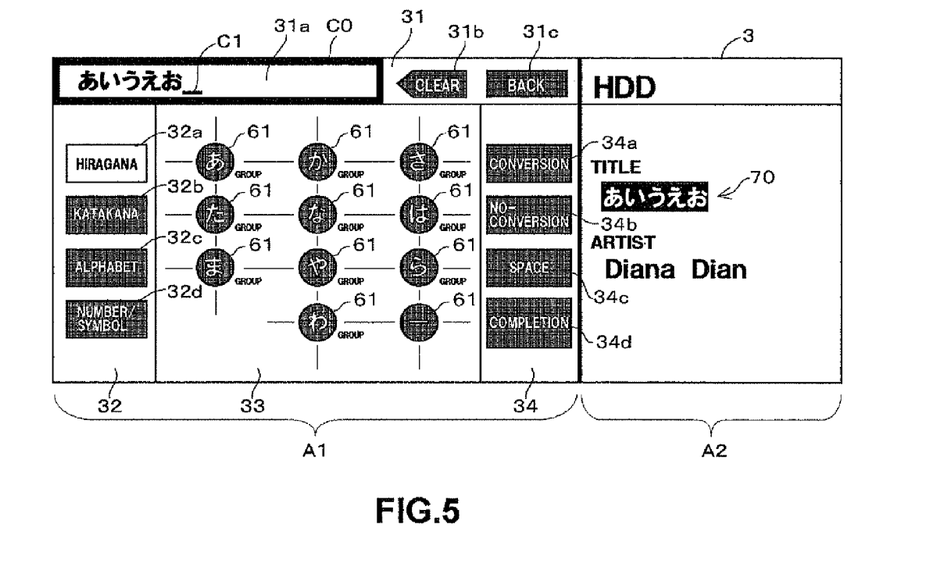
FIG. 5 is a view showing one example of a display screen for making entry of characters.

FIG. 5 is a view showing one example screen for making entry of characters on the display 3. The screen is displayed through prescribed operations at the situation where the entry of characters is required. As shown in FIG. 5, the screen area of the display 3 is divided largely into two areas; a character area A1 on the left and an object area A2 on the right. The character area A1, making approx. two thirds of the screen area, is used for making entry of characters. The object area A2, making approx. one third of the screen area, is an area showing objects to be edited. The example of FIG. 5 shows the situation for the correction of a title of audio data stored in a hard disk. Here, in the object area A2, a title 70 of audio data is highlighted to show it is an object being edited in making entry of characters.

The character area A1 has a text edition area 31 on an upper position. The area under the text edition area 31 in the character area A1 is divided longitudinally into three areas; a type change area 32 on the left, a character selection area 33 on the center, and a command area 34 on the right.

A selection cursor C0 is displayed inside the character area A1. The selection cursor C0 is moved leftward, rightward, upward and downward by the directional operation operated to the main controller 50. The selection cursor C0 can move anywhere among the text edition area 31, the type change area 32 the character selection area 33 and the command area 34. By operating the main controller 50 after selecting one item from amongst a plurality of items in each area with the selection cursor C0, a user can give further instructions for the selected item.

Hereinafter, the text edition area 31, character selection area 33, type change area 32 and command area 34 will be described respectively.

<2-2. Text Edition Area>

First, the text edition area 31 is described. The text edition area 31 includes a text entry bar 31a, a clear button 31b and a back button 31c, which are the items to be selected with the selection cursor C0. The directional operation (left or right) using the main controller 50 moves the selection cursor C0 among these items.

The text entry bar 31a is an area where a text string under editing is shown. A location cursor C1 which shows a location for making entry of characters is displayed in the text entry bar 31a. Under the text entry bar 31a selected with the selection cursor C0, a turning operation using the main controller 50 moves the location cursor C1 left and right within the text entry bar 31a. This operation changes the location where a character is entered.

The clear button 31b is an item to execute a command to delete a character in the text entry bar 31a. With a press operation using the main controller 50 under the clear button 31b selected with the selection cursor C0, the instruction receiver 12 receives the command for deletion. With this reception, the character pointed by the location cursor C1 (it is the last character when the location cursor C1 is behind the character string.) is to be deleted, among the characters of the text string displayed in the text entry bar 31a.

The back button 31c is an item to execute a command to cancel the entry of characters. With a press operation using the main controller 50 under the back button 31c selected with the selection cursor C0, the instruction receiver 12 receives the command for cancel. With this reception, the screen for making entry of characters is changed back to the screen before editing without any change in the characters under editing.

<2-3. Character Selection Area>
<2-3-1. Entry of Characters>

Next, the character selection area 33 is described. The character selection area 33 is an area where a user selects a character to be entered. A plurality of candidate characters for making entry of characters are divided into groups. In the character selection area 33, a plurality of items 61 representing the groups (hereinafter referred to as "group item/items" 61) are set in a two-dimensional (vertical and horizontal) array.

FIG. 5 shows one example screen for entering a Japanese character "Hiragana." Here, a plurality of candidate Japanese characters are divided into groups based on lines (consonants) in Japanese syllabary. The divided groups are shown respectively as the plurality of group items 61, specifically, "A," "KA," "SA," "TA," etc. (Here, "KA," "SA" and "TA" are shown in Japanese characters in FIG. 5. Specifically, "KA" is shown at the center top in the character selection area 33, "SA" at the right top and "TA" at the left on the second line.)

Under a state that one of the items in the text edition area 31 is selected with the selection cursor C0, a directional operation of downward using the main controller 50 moves the selection cursor C0 into the character selection area 33. Here, as a default setting, an item at the top left corner in the plurality of group items 61 in the character selection area 33 is selected with the selection cursor C0.

Figure 6:
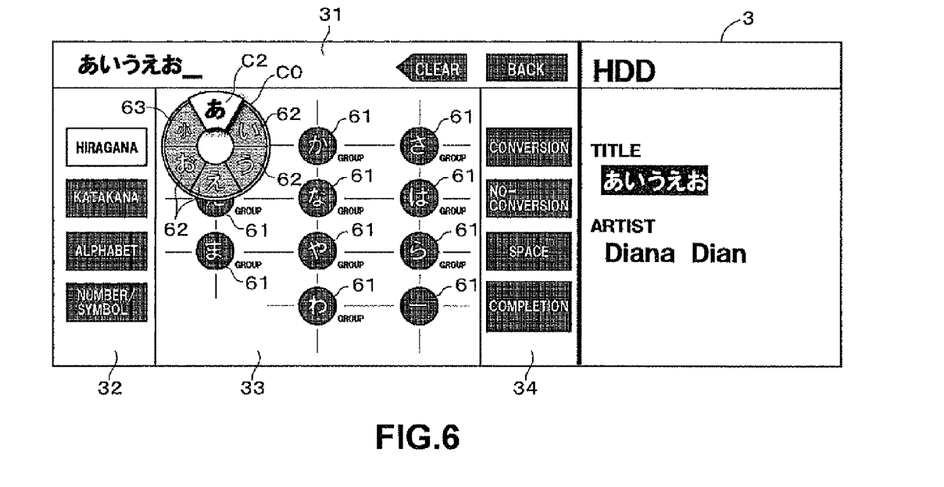
FIG. 6 is a view showing another example of the display screen for making entry of characters.

FIG. 6 is a screen showing that a group of "A" shown at the left top corner is selected from amongst the group items 61 with the selection cursor C0. (Here, the group of "A" includes five characters of "A," "I," "U," "E" and "O," which are corresponding to five vowels.) Under this state, a directional operation using the main controller 50 moves the selection cursor C0 among these group items 61.

Figure 7:
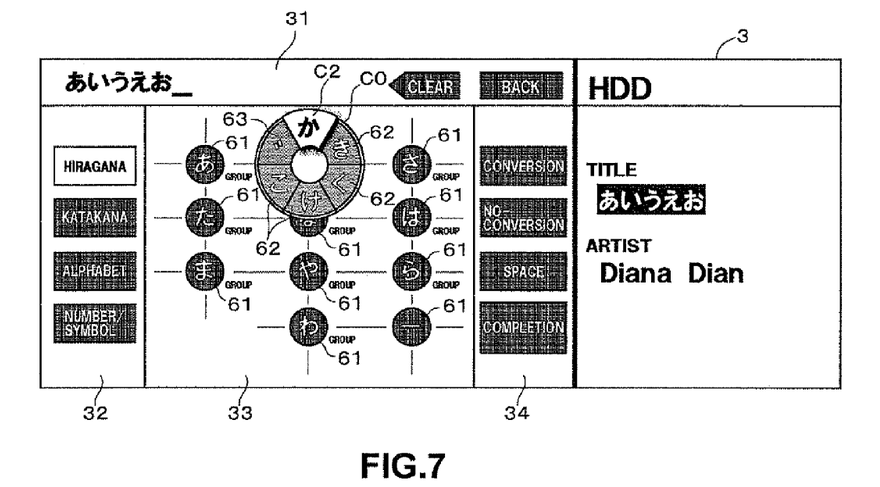
FIG. 7 is a view showing another example of the display screen for making entry of characters.
Figure 8:
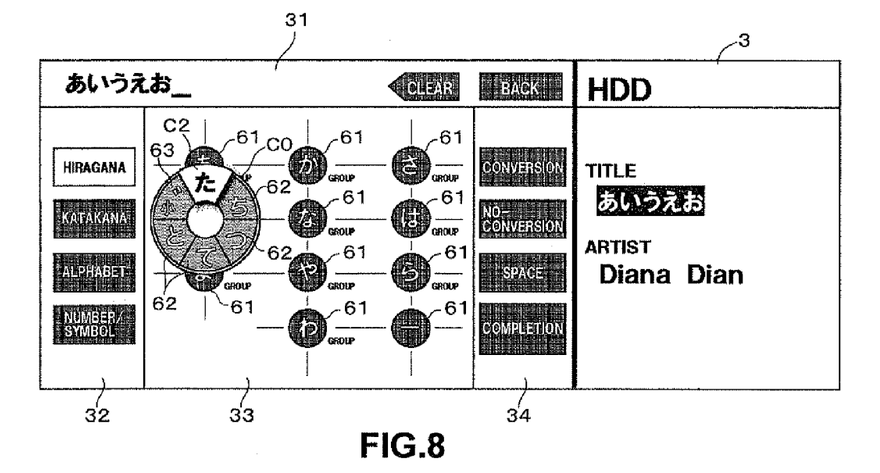
FIG. 8 is a view showing another example of the display screen for making entry of characters.

For example, with a directional operation of rightward under the state shown in FIG. 6, a group of "KA" is selected from amongst the group item 61 as shown in FIG. 7, with the selection cursor C0. (Here, the group of "KA" includes five characters of "KA," "KI," "KU," "KE" and "KO," which are composed of a consonant "k" and the five vowels.) Besides, with a directional operation of downward under the state shown in FIG. 6, a group of "TA" among the group items 61 is selected as shown in FIG. 8, with the selection cursor C0. (Here, the group of "TA" includes five characters of "TA," "TI," "TU," "TE" and "TO," which are composed of a consonant "t" and the five vowels.) As above, the directional operations using the main controller 50 are received by the instruction receiver 12 as the instructions for group selection. Thus, the selection cursor C0 in the character selection area 33 is also called "group cursor" C0 since the selection cursor C0 is used for selecting the group item 61.

As shown in FIGS. 6, 7 and 8, the group cursor C0 is shown with a circular frame. The area inside the circular frame of the group cursor C0 is divided into a plurality of smaller areas by a plurality of lines drawn radially from the center. Each of these divided areas has a shape of approximately sector. A plurality of these areas are respectively corresponding to a plurality of items (hereinafter refereed to as "character items 62") which are indicating the characters included in the group selected. In other words, the character items 62 which indicate characters included in one group are arrayed in a circular pattern Concretely, as shown in FIG. 6, when the group of "A" of the group item 61 is selected with the group cursor C0, the character items 62 indicating the characters included in the group of "A" (i.e. "A," "I," "U," "E" and "O") are displayed in a circular pattern. (Here, specifically, Japanese character of "A" is shown at the top, "I" is at the upper right, "U" is at the lower right, "E" is at the bottom, and "O" is at the lower left) Here, the character items 62 of the characters included in other groups (for example, group of "KA," group of "SA" and group of "TA") are not shown.

In the same manner, as shown in FIG. 7, when a group of "KA" of the group item 61 is selected with the group cursor C0, the character items 62 of the characters included in the group of "KA" (i.e. "KA," "KI," "KU," "KE" and "KO") are displayed in a circular pattern, and the character items 62 of the characters included in other groups are not displayed. (Here, specifically, Japanese character of "KA" is shown at the top, "KI" is at the upper right, "KU" is at the lower right, "KE" is at the bottom, and "KO" is at the lower left.) In the same manner, as shown in FIG. 7, when a group of "TA" of the group item 61 is selected with the group cursor C0, the character items 62 of the characters included in the group of "TA" (i.e. "TA," "TI," "TU," "TE" and "TO") are displayed in a circular pattern, and the character items 62 of the characters included in other groups are not displayed. (Here, specifically, Japanese character of "TA" is shown at the top, "TI" is at the upper right, "TU" is at the lower right, "TE" is at the bottom, and "TO" is at the lower left) In these manners, only the character items 62 of the characters included in the group selected with the group cursor C0 are displayed, and the character items 62 of the characters included in the group not selected are not displayed.

The group cursor C0 includes a character cursor C2 for selecting one from amongst the character items 62. A turning operation using the main controller 50 moves the character cursor C2. Specifically, a clockwise operation using the main controller 50 moves the character cursor C2 clockwise to one next character item 62 within the group cursor C0. A counterclockwise operation using the main controller 50 moves the character cursor C2 counterclockwise to one next character item 62 within the group cursor C0.

Figure 9:
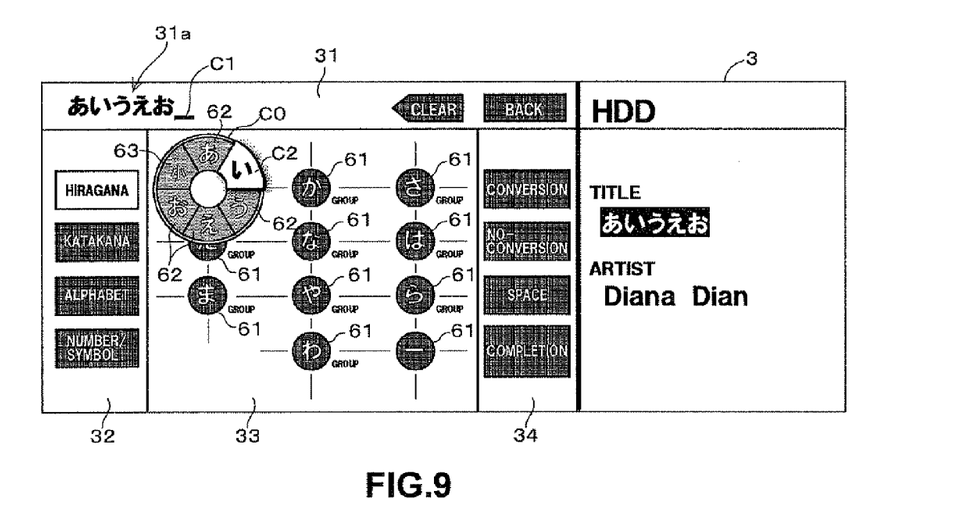
FIG. 9 is a view showing another example of the display screen for making entry of characters.

In an example, a clockwise operation using the main controller 50 at the state shown in FIG. 6 moves the character cursor C2 from the character item 62 of "A" to the character item 62 of "I" of clockwise next as shown in FIG. 9. Here, the character item 62 of "I" is selected with the character cursor C2. On the contrary, a counterclockwise operation using the main controller 50 at the state shown in FIG. 9 moves the character cursor C2 from the character item 62 of "I" to the character item 62 of "A" of counterclockwise next as shown in FIG. 6. In such a way, the turning operation using the main controller 50 is received by the instruction receiver 12 as an instruction for selecting a character included in the group selected with the group cursor C0.

Figure 10:
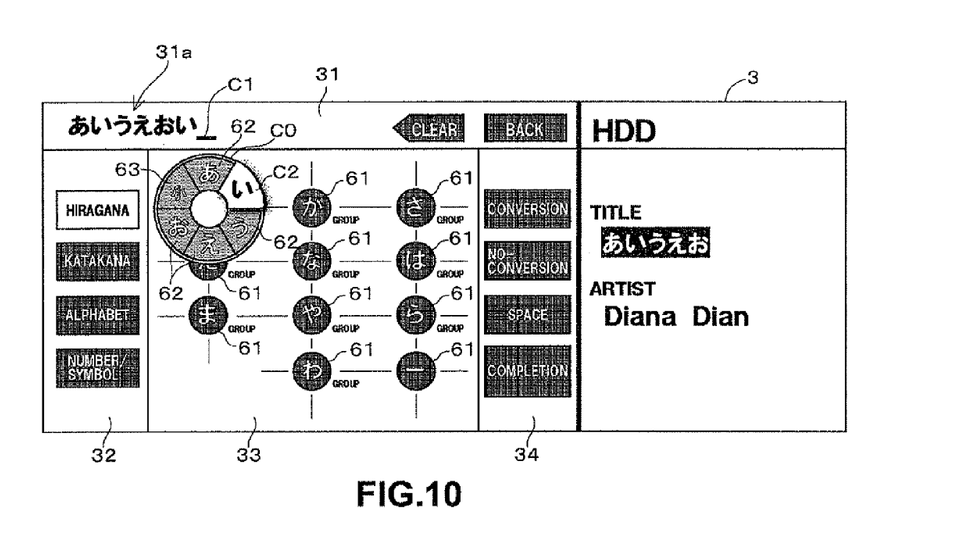
FIG. 10 is a view showing another example of the display screen for making entry of characters.

With a press operation using the main controller 50, the character shown in the character item 62 selected with the character cursor C2 at the time is determined to be entered. In other words, the press operation using the main controller 50 is received by the instruction receiver 12 as an instruction for determining the character selected at that time. With this reception, the determined character is entered at the location where the location cursor C1 is in the text entry bar 31a, and then, the location cursor C1 is moved to the character one-next-behind. In an example, with a press operation using the main controller 50 at the state shown in FIG. 9, the character "I" selected with the character cursor C2 is determined, and then, the character "I" is entered at the location where the location cursor C1 is, in the text entry bar 31a as shown in FIG. 10.

Under the system adopting this operation system, the user can select a group (a group of character classified by consonants in Japanese syllabary) by the directional operation using the main controller 50, and a character (a character specified by vowels in the group of Japanese syllabary) included in the selected group by the turning operation. As a result, combining two types of operations; the directional operation and the turning operation, the user can quickly select an intended character from many candidate characters included in "Hiragana" by a very few operations. By adopting different kind of operations (the directional operation and the turning operation) for the group selection and the character selection, the user can select the group and the character individually without operation for determining the group. Thus, the user can accurately select an intended character through the accurate group selection and character selection. As a result, the system provides greater user friendliness in making entry of characters.

At the time of the group cursor C0 moving, the character cursor C2 may keep the vowel in Japanese syllabary which was selected before moving, or may move to the characters which have the vowel of "A" ("A," "KA," "SA," "TA," "NA," etc.) which are displayed at the top of the circular pattern of the group cursor C0. Keeping the vowel in the Japanese syllabary of the character which was selected before moving allows both of character selection ways of the selection from consonants and the selection from vowels, as the next selection step for making entry of characters. Thus, the user can quickly select an intended character with fewer operations.

<2-3-2. Flow for Entry Reception of Character>

Figure 11:
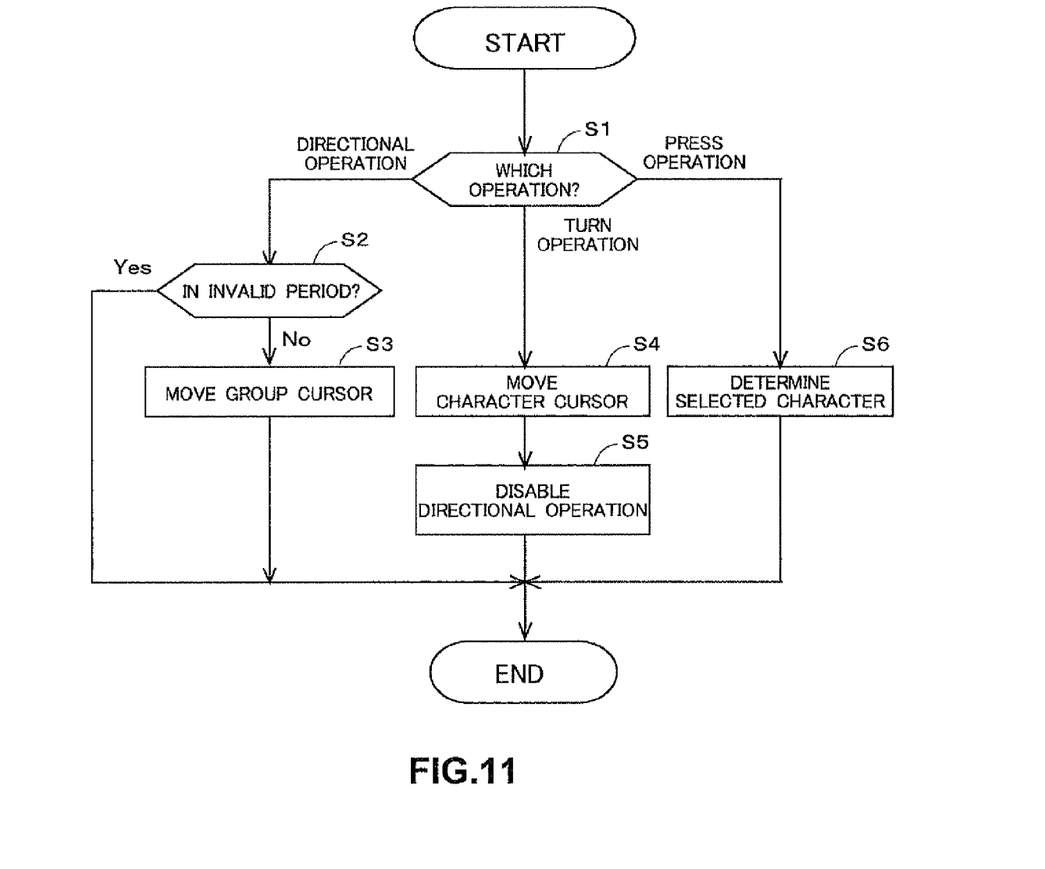
FIG. 11 is a flowchart showing processing for accepting an instruction given by a user for making entry of characters.

FIG. 11 is a flowchart of the processing from a user operation using the main controller 50 for making entry of characters to the reception at the instruction receiver 12. This processing is performed every time the main controller 50 is operated.

First, the operation using the main controller 50 is judged whether it is a press operation, a turning operation or a directional operation (step S1). When the directional operation is received as a group selection instruction, the group cursor C0 is moved to the direction according to the directional operation instruction (step S3). When the turning operation is received as a character selection instruction, the character cursor C2 is moved to the rotational direction according to the turning operation instruction (step S4). When the press operation is received as a determination instruction to the character selected, the character of the character item 62 selected with the character cursor C2 is entered (step S6).

The turning operation and the directional operation using the main controller 50 can be performed at the same time. Thus, a user may wrongly perform the directional operation during the turning operation to move the character cursor C2. In this case, the group cursor C0 moves to an unintended group item 61. This causes the user-friendliness to become worse. To respond to the case, the instruction receiver 12 of the embodiment is designed to receive the turning operation instruction in preference to the directional operation instruction.

Specifically, when a user performs a turning operation using the main controller 50, the system disables a directional operation for a certain period (for example, for 0.5 seconds) (step S5). During this invalid period that directional operation is disabled ("Yes" at the step S2), the directional operation instruction is not received, if any. Thus, during the turning operation, an unintentional directional operation does not cause any problem, if any. As a result, the system provides greater user-friendliness in making entry of characters.

As described above, the two types of operations, the directional operation and the turning operation, of the in-vehicle display system 100 allow for greater user-friendliness. However, if the invalid period of the directional operation is set longer, the user-friendliness may become worse. On the other hands, if the no-effect period of the directional operation is set too short, the system for making entry of characters may receive a miss operation. Here, for example, the period between about 0.3 seconds and about 1.0 seconds is desirable for the no-effect period of the directional operation.

<2-3-3. Entry of Japanese Kana Other than 46-Basic Kanas>

In the character selection area 33, "Hiraganas" other than 46-basic kanas can be entered too, such as small-sized kanas of e.g. "TU" and "YA", and kanas of "dakuon" and "handakuon" which are indicated by auxiliary marks which are attached at the upper right of the character.

As described above, a plurality of the character items 62 are arrayed in a circular pattern in the group cursor C0. Here, a switch command item 63, switching a character version to the one other than the 46-basic kanas, is also arrayed in a string along with the plurality of character items 62 as shown in FIGS. 6, 7 and 8. The user can move the character cursor C2 also to the switch command item 63 as well as to the character items 62 by performing a turning operation. When the user performs a press operation at the state where the switch command item 63 is selected with the character cursor C2, a command for switching is received by the instruction receiver 12, and then, the character items 62 in the group cursor C0 are changed to displaying the characters other than 46-basic kanas.

Figure 12:
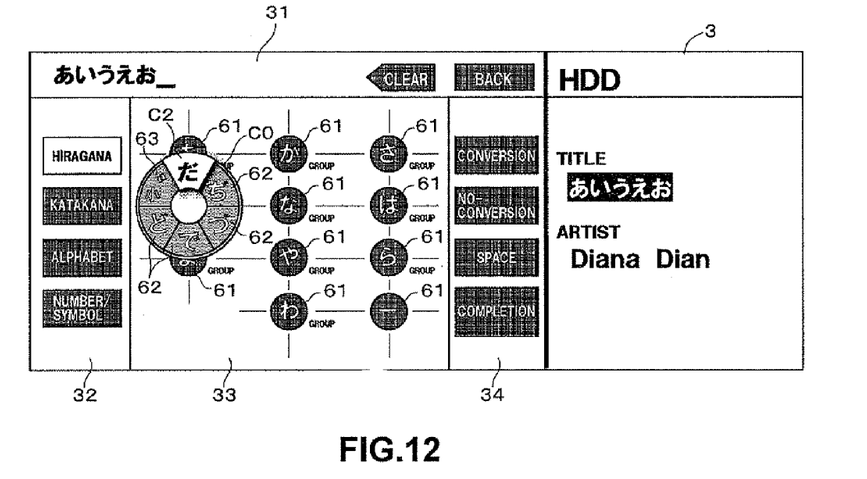
FIG. 12 is a view showing another example of the display screen for making entry of characters.
Figure 13:
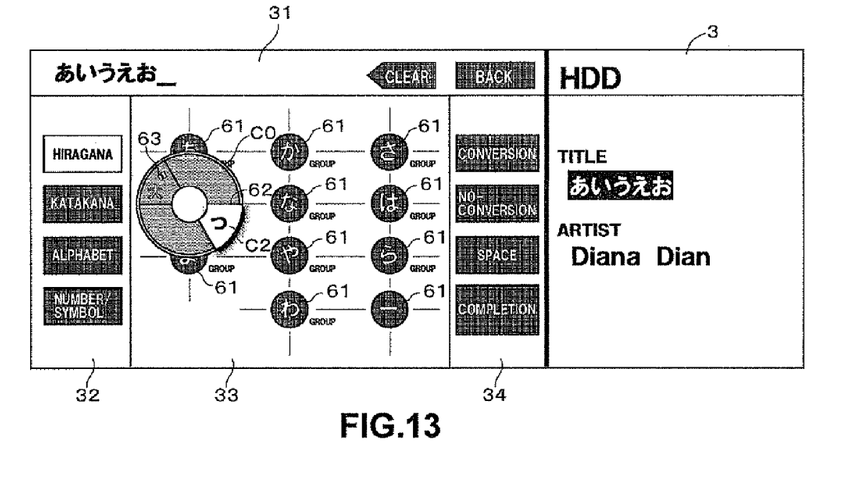
FIG. 13 is a view showing another example of the display screen for making entry of characters.

Here is an example at the state the character items 62 show the 46-basic kanas of group of "TA" ("TA," "TI," "TU," "TE" and "TO") as shown in FIG. 8. When the user performs a press operation after selecting the switch command item 63 here, the screen is changed to the one shown in FIG. 12. In FIG. 12, characters of "dakuon" version of the group of "TA" are displayed in the character items 62 respectively. Further, when the user performs a press operation after selecting the switch command item 63 at the state in FIG. 12, the screen is changed to the one shown in FIG. 13. In FIG. 13, a character of small-sized kana of "TU" of 46-basic kanas is displayed in the character item 62. These characters in the character items 62 are also entered in the same manner as the 46-basic kanas. When the user performs a press operation after selecting the switch command item 63 at the state shown in FIG. 13, the screen is back to the state (where the 46-basic kanas are to be entered) shown in FIG. 8.

<2-4. Type Change Area>

Next, back to FIG. 5, the type change area 32 is described. When the user performs a directional operation of leftward using the main controller 50 at the state where one of the group items 61 set at the left end vertical row in the character selection area 33 is selected with the selection cursor (group cursor) C0, the selection cursor C0 is moved into the type change area 32.

The type change area 32 has a hiragana button 32*a*, a katakana button 32*b*, an alphabetical character button 32*c* and number/symbol button 32*d*, which are the items to be selected with the selection cursor C0. A user can move the selection cursor C0 among these items by directional operations of upward or of downward using the main controller 50.

These buttons 32*a*, 32*b*, 32*c* and 32*d* are the command items to change the types of characters to be entered with the use of the character selection area 33. When the user performs a press operation at the state where the hiragana button 32*a* is selected with the selection cursor C0, "Hiraganas" become available for making entry of characters in the character selection area 33. Besides, when the user performs the press operation at the state where the katakana button 32*b* is selected, "Katakanas" become available at making entry of characters. In the same manner, when the user performs the press operation at the state where the alphabetical character button 32*c* is selected, "alphabets" become available for making entry of characters. When the user performs the press operation at the state where the number/symbol button 32*d* is selected, "numbers" and "symbols" become available at making entry of characters.

Figure 14:
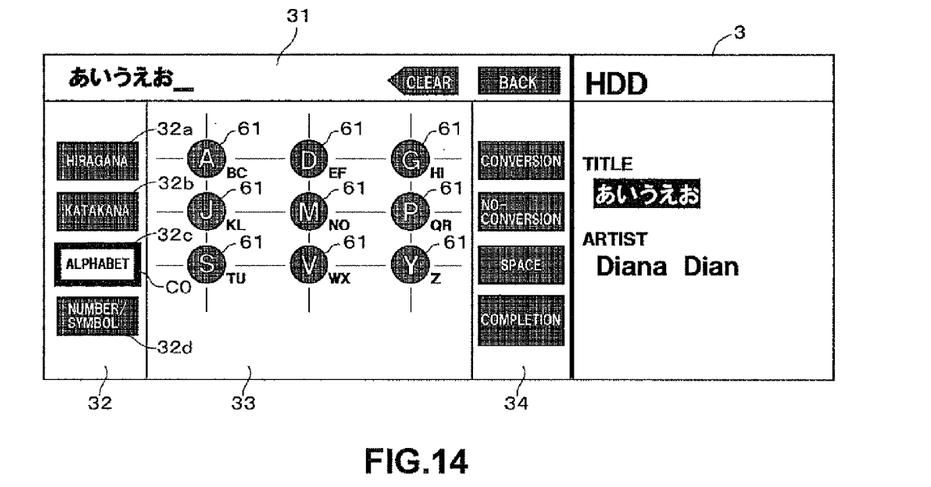
FIG. 14 is a view showing another example of the display screen for making entry of characters.

FIG. 14 is an example screen when the user performs the press operation at the state where the alphabetical character button 32*c* is selected. The character selection area 33 has the group items 61 that respectively show the groups in which a plurality of "alphabets" to be entered are classified. The "alphabets" are classified, for example, into groups in which three characters each are included based on the alphabetical order. When the user moves the selection cursor C0 into the character selection area 33 by the directional operation of rightward at the state in FIG. 14, the selection cursor C0 becomes the group cursor C0 as in FIG. 15. Here, in the group cursor C0, the character items 62 showing the characters included in a selected group are arrayed in a circular pattern. In the example shown in FIG. 15, a group of "ABC" of the group item 61 is selected with the group cursor C0. Here, the character items 62 showing "A," "B" and "C" included in the group of "ABC" are arrayed in a circular pattern. These characters in the character items 62 are also to be entered in the same operation as the one for "Hiraganas."

Figure 15:
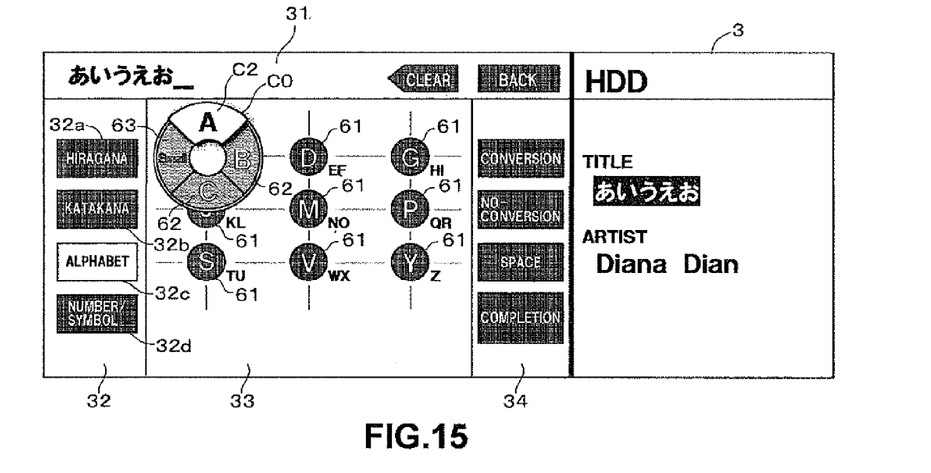
FIG. 15 is a view showing another example of the display screen for making entry of characters.

Here, the group cursor C0 also includes the switch command item 63 arrayed in a string along with the character items 62. When the user performs the press operation at the state where the switch command item 63 is selected, the lower-case characters ("a," "b" and "c") of "alphabets" become available at making entry of characters.

<2-5. Command Area>

Next, back to FIG. 5 again, the command area 34 is described. When the user performs the directional operation of rightward using the main controller 50 at the state where one of the group items 61 set at the right end vertical row in the character selection area 33 is selected with the selection cursor (group cursor) C0, the selection cursor C0 is moved into the command area 34.

The command area 34 has a conversion button 34*a*, a no-conversion button 34*b*, a space button 34*c* and a completion button 34*d*, which are a plurality of the items to be selected with the selection cursor C0. A user can move the selection cursor C0 among these items by directional operations of upward or of downward using the main controller 50.

The conversion button 34*a* is the command item to convert into a kanji (Chinese character) the characters entered in the text entry bar 31*a*. When the user performs the press operation using the main controller 50 at the state where the conversion button 34*a* is selected with the selection cursor C0, the instruction receiver 12 receives the command for conversion. Here, the characters entered in the text entry bar 31*a* are converted into kanjis. The user can select proper kanjis from candidates for kanji conversion by the turning operation using the main controller 50. Then the user can determine the selected kanjis by the press operation using the main controller 50. It is desirable that the characters which are subjects of conversion in the character string displayed in the text entry bar 31*a* are displayed in bigger size compared to other characters.

The no-conversion button 34*b* is the command item to leave the characters entered in the text entry bar 31*a* as is in "Hiraganas." When the user performs the press operation using the main controller 50 at the state where the no-conversion button 34*b* is selected with the selection cursor C0, the instruction receiver 12 receives the command for no conversion. Here, the characters entered in the text entry bar 31*a* are determined as is in "Hiraganas" without being converted into kanji.

The space button 34*c* is the command item to enter a space (blank) in the text entry bar 31*a*. When the user performs the press operation using the main controller 50 at the state where the space button 34*c* is selected with the selection cursor C0, the instruction receiver 12 receives the command for a space entry. Here, a space is entered at the location where the location cursor C1 is in the text entry bar 31*a*.

The completion button 34*d* is the command item to determine the character string entered in the text entry bar 31*a* and complete the entry of characters. When the user performs the press operation using the main controller 50 at the state where the completion button 34*d* is selected with the selection cursor C0, the instruction receiver 12 receives the command for completion. Here, the screen for making entry of characters changes back to the one before editing, and the character string entered in the text entry bar 31*a* is reflected into the subject of editing.

Figure 16:
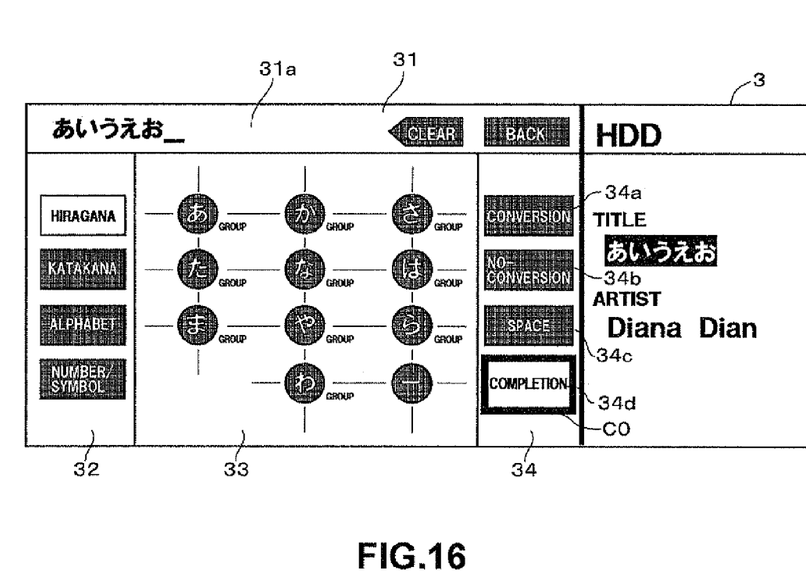
FIG. 16 is a view showing another example of the display screen for making entry of characters.

The completion button 34*d* is most frequently used among the command items included in the command area 34. Thus, it is desirable that the completion button 34*d* is always selected with the selection cursor C0 just after when the selection cursor C0 is moved into the command area 34, as shown in FIG. 16. The conversion button 34*a* is also relatively frequently used. Thus, the conversion button 34*a* always may be selected with the selection cursor C0 just after when the selection cursor C0 is moved into the command area 34.

As described above, the in-vehicle display system 100 of the embodiment allows individual selection operations for selections of the group and for selection of the character which is included in the selected group by the two types of operations, the directional operation and the turning operation, using the main controller 50. This allows for quick and accurate selection of the intended characters with a few operations. As a result, the system provides greater user-friendliness in making entry of characters. Especially, classifying of Japanese kanas (Hiraganas and Katakanas) into groups based on the consonants of Japanese syllabary provides greater user-friendliness allowing for quick selection of the intended characters at making entry of characters.

Besides, the user can easily select a group by the directional operation from amongst the plurality of group items 61 displayed in a two-dimensional array. Also, the user can easily select a character by the turning operation from amongst the plurality of character items 62 due to the display of the characters included in the group, which are arrayed in a circular pattern.

Among the character items 62 of the plurality of candidate characters for making entry of characters, the character items 62 of the characters included in the group selected are displayed. Here, the character items 62 of the characters included in the group not selected are not displayed. Under this indication system displaying only the character items 62 of the characters included in the group selected, the user can easily grasp the characters available for selection by the turning operations.

<3. Modification Example>

Hereinafter, a modification example is described. It is possible that all the embodiments including the embodiment described above and the embodiments to be described below are combined when needed.

While the embodiment mentioned above uses the Japanese kanas (Hiraganas and Katakanas) classified into groups based on the consonants of the Japanese syllabary, other embodiments may use the Japanese kanas divided into groups based on the vowels of the Japanese syllabary.

Besides, while the embodiment mentioned above uses the directional operation for selecting the group and uses the turning operation for selecting the character included in the group, other embodiments may use the turning operation for selecting the group and may use the directional operation for selecting the character included in the group.

Figure 17:
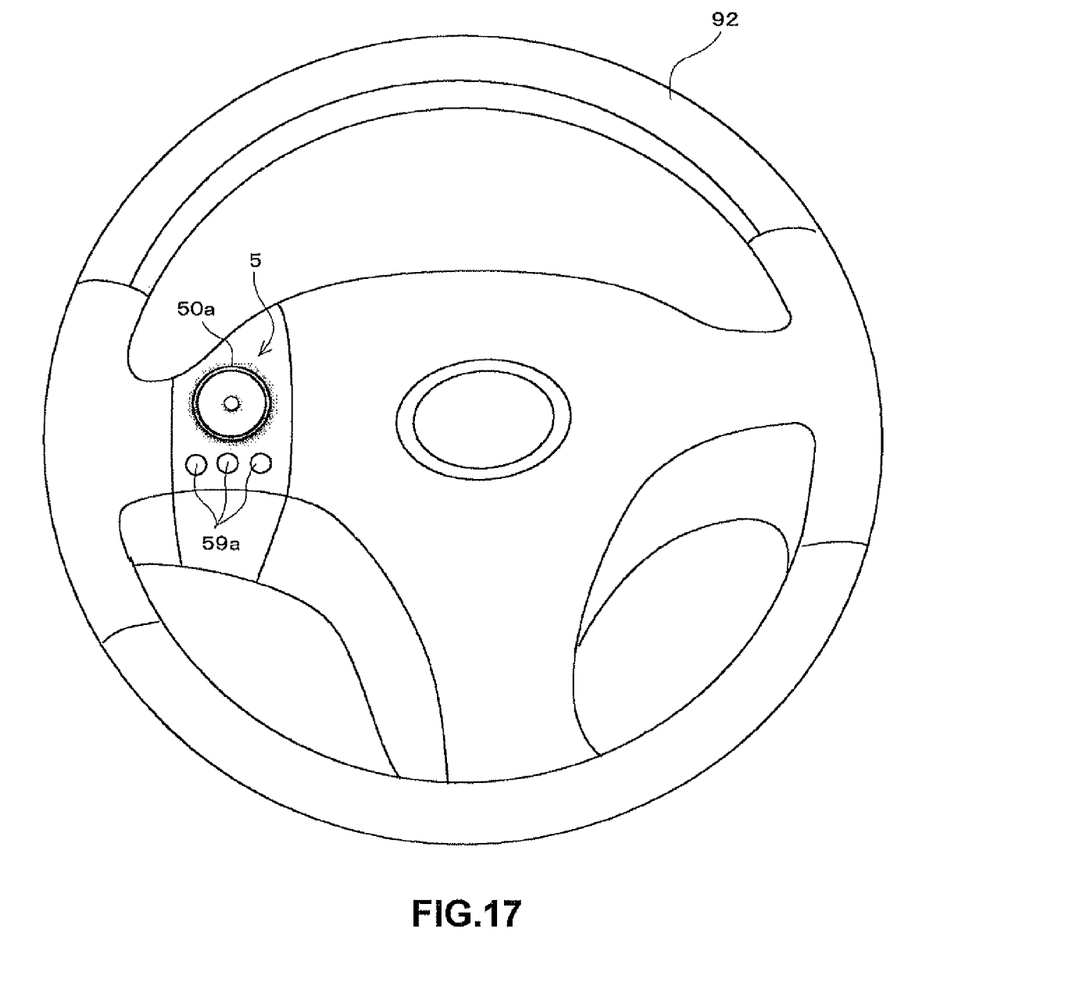
FIG. 17 is a view showing a steering wheel with a controller located on it.

Besides, while the embodiment described above has the operation unit 5 on the center console 93, other embodiments may have the operation unit 5 anywhere else the user can easily operate it. In an example, as shown in FIG. 17, the operation unit 5 may be set on the steering wheel 92. In this example of FIG. 17, both of a main controller 50a and a mode switch button 59a are set on the left side of the steering wheel 92. The main controller 50a is capable of controlling all operations of a turning operation, a press operation and a directional operation. The mode switch button 59a is capable of controlling switching operation modes. Here, other settings are also acceptable; the steering wheel 92 may have the main controller 50a on its left side and may have the mode switch button 59a on its right side, for example.

Besides, the embodiment described above has various functions implemented by software performed by processing of CPU based on a program, however, a part of these functions may be implemented by hardware using electrical circuits.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle display system for installation in a vehicle, the system comprising:
   a display unit that displays information;
   an operation unit that is located separately from the display unit and that allows a user to perform user operations including a directional operation and a turning operation; and
   a receiver that receives user instructions for making entry of plural characters that can be displayed on the display unit, based on displayed content displayed on the display unit and the user operations made with the operation unit,
   the receiver receiving:
   (i) the directional operation as the user instruction in order to select a group from amongst a plurality of groups displayed on the display unit each of the plurality of groups representing a plurality of characters which are candidates for entry, and
   (ii) the turning operation as the user instruction in order to select a character from amongst the plural characters included in the group that is selected by the directional operation,
   the display unit displaying:
   the plurality of groups in a two-dimensional array; and
   at least some of the plurality of characters included in the group selected by the directional operation, the at least some of the plurality of characters being in a circular pattern centered on a position of the group selected by the directional operation.

2. The in-vehicle display system of claim 1, wherein the display unit displays at least some of the plural characters included in the group that is selected, and does not display at least some of the plural characters included in the groups that are not selected from amongst the plurality of groups.

3. The in-vehicle display system of claim 1, wherein the operation unit includes one controller member by which the user performs both of the turning operation and the directional operation.

4. The in-vehicle display system of claim 3, wherein the receiver receives the user instruction given by the turning operation in preference to the user instruction given by the directional operation.

5. The in-vehicle display system of claim 1, wherein the plural characters include Japanese characters.

6. The in-vehicle display system of claim 4, wherein: the receiver waits a predetermined time period after receipt of the turning operation before accepting the directional operation.

7. The in-vehicle display system of claim 6, wherein: the predetermined time period is between about 0.3 seconds and about 1.0 seconds.

8. The in-vehicle display system of claim 1, wherein: the display unit displays the plurality of groups as selectable items without displaying all of the plurality of characters which are candidates for entry.

9. The in-vehicle display system of claim 1, wherein: before the directional operation is received, the display unit displays the plurality of groups as selectable items, and after the directional operation is received, the display unit continues to display the plurality of groups as selectable items, while displaying the plural characters included in the group selected by the directional.

* * * * *